United States Patent
Hyugaji et al.

(10) Patent No.: US 11,128,228 B2
(45) Date of Patent: Sep. 21, 2021

(54) SWITCHING POWER SUPPLY DEVICE

(71) Applicants: Takumi Hyugaji, Isehara (JP); Takeshi Sato, Yokohama (JP); Minoru Kado, Hachioji (JP)

(72) Inventors: Takumi Hyugaji, Isehara (JP); Takeshi Sato, Yokohama (JP); Minoru Kado, Hachioji (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/813,465

(22) Filed: Mar. 9, 2020

(65) Prior Publication Data

US 2020/0313563 A1    Oct. 1, 2020

(30) Foreign Application Priority Data

Mar. 27, 2019    (JP) .............................. JP2019-060433

(51) Int. Cl.
*H02M 3/335*    (2006.01)

(52) U.S. Cl.
CPC ... *H02M 3/33592* (2013.01); *H02M 3/33507* (2013.01)

(58) Field of Classification Search
CPC ......... H02M 3/33592; H02M 3/33507; H02M 3/33547; H02M 1/32; H02M 2001/0058; H02M 3/33523; H02M 2001/0009; H02M 3/3376; H02M 3/33576
See application file for complete search history.

(56) References Cited

U.S. PATENT DOCUMENTS

| | | | |
|---|---|---|---|
| 7,633,780 B2 | 12/2009 | Endo et al. | |
| 8,040,698 B2 | 10/2011 | Hyuugaji | |
| 9,030,131 B2 | 5/2015 | Kado et al. | |
| 9,331,593 B2 | 5/2016 | Hyugaji et al. | |
| 9,602,010 B2 | 3/2017 | Arima et al. | |
| 9,923,475 B2 * | 3/2018 | Kleinpenning ... | H02M 3/33592 |
| 10,536,089 B2 | 1/2020 | Hyugaji et al. | |
| 2007/0201253 A1 | 8/2007 | Endo et al. | |
| 2009/0279326 A1 | 11/2009 | Hyuugaji | |
| 2020/0280264 A1 * | 9/2020 | Kado ................ | H02M 3/33523 |
| 2020/0313562 A1 * | 10/2020 | Hyugaji ............ | H02M 3/33576 |

FOREIGN PATENT DOCUMENTS

| | | |
|---|---|---|
| JP | 4862432 B2 | 2/2006 |
| JP | 5115317 B2 | 10/2012 |

* cited by examiner

*Primary Examiner* — Adolf D Berhane
(74) *Attorney, Agent, or Firm* — Holtz, Holtz & Volek PC

(57) ABSTRACT

A switching power supply device includes a transformer for voltage conversion, a synchronous rectification MOS transistor, and a secondary side control circuit. The synchronous rectification MOS transistor is connected in series to a secondary side coil of the transformer. The secondary side control circuit performs on/off control of the synchronous rectification MOS transistor based on a drain voltage of the synchronous rectification MOS transistor. The secondary side control circuit includes a peak period detection circuit and a determination reference voltage generation circuit. The peak period detection circuit detects a peak period of the drain voltage. The determination reference voltage generation circuit generates a reference voltage to be used as a reference for determining the peak period based on a voltage in the peak period. The peak period detection circuit detects the peak period based on the drain voltage and on the reference voltage.

4 Claims, 6 Drawing Sheets

Prior Art

SWITCHING POWER SUPPLY DEVICE

CROSS REFERENCE TO RELATED APPLICATION

This application is based upon and claims the benefit of priority under 35 USC 119 of Japanese Patent Application No. 2019-060433 filed on Mar. 27, 2019, the entire disclosure of which, including the description, claims, drawings and abstract, is incorporated herein by reference in its entirety.

BACKGROUND OF THE INVENTION

1. Field of the Invention

The present invention relates to a direct-current power supply device of a switching control system including a transformer for voltage conversion, and, for example, relates to a technique effective for use in an insulated DC-DC converter including a synchronous rectification switch on the secondary side of the transformer.

2. Description of Related Art

One of conventional switching power supply devices is a switching power supply device (insulated DC-DC converter) including: a MOS transistor (insulated-gate field-effect transistor) as a switching element for intermittently flowing a current to a primary side coil of a transformer; and a control circuit (IC) that performs on/off control of the element, in which a current induced in a secondary side coil by the current flown to the primary side coil is rectified by a diode, and smoothed by and output from a capacitor.

In an insulated DC-DC converter in which a rectification diode is used in a secondary side circuit, a loss in the rectification diode is large, which causes a reduction in efficiency. Therefore, there is a technique for providing a switching element (MOS transistor) for synchronous rectification instead of a rectification diode in the secondary side circuit, detecting a terminal voltage (source-drain voltage) of the secondary side switching element with a secondary side control circuit, and performing turn-on control of the secondary side switching element at a timing at which a forward current flows into a body diode, thereby reducing a loss in the rectification element and increasing the efficiency (for example, JP 4862432 B2).

In a switching power supply device including a transformer, the primary side circuit and the secondary side circuit are electrically insulated. Thus, an insulated signal transmission component such as a photo-interrupter needs to be provided in order to inform the secondary side circuit of occurrence of an abnormality from the primary side circuit in a case where the abnormality has occurred on the primary side, and it is difficult to transmit a signal without adding any component.

In the case where an abnormality occurs on the primary side, the operation of the secondary side circuit can be stopped by a primary side control circuit stopping on/off control of a primary side switching element. In this case, however, the reason why the operation of the secondary side circuit is stopped is not because a secondary side control circuit recognizes that an abnormality has occurred on the primary side. Thus, in a case where an abnormality, such as, for example, a reduction of an input voltage with an AC ripple, that does not cause control on the primary side to be stopped, has occurred on the primary side, it is difficult for the secondary side circuit to recognize such an abnormality on the primary side to stop on/off control or change control.

On the other hand, since a period in which a source-drain voltage VDS of a synchronous rectification MOS transistor on the secondary side attains a peak is substantially equal to an on-period of the primary side switch, a state on the primary side is recognized indirectly from the VDS waveform on the secondary side. On the basis of this, in such a case where there is an abnormality in the on-period of the primary side switch, for example, control such as not turning on the synchronous rectification MOS transistor on the secondary side is performed to increase the safety of the circuit. Since a source terminal of the synchronous rectification MOS transistor is generally connected to a ground point on the secondary side, the source-drain voltage will be briefly referred to as a drain voltage in the following description.

Since the amplitude of the drain voltage VDS is changed with the state of a power source or an input voltage on the primary side, a VDS peak period cannot be detected correctly by comparing a fixed reference value and VDS. Various power sources can be dealt with if a reference value for comparison is provided on the basis of a voltage in the peak period of VDS. However, in a case of using a peak hold circuit including a simple diode and a capacitor, problems arise in that a holding voltage is reduced with a forward voltage Vf of the diode, and the degree of influence on a change in Vf exerted by the temperature increases as the VDS amplitude is smaller because Vf significantly depends on the temperature.

When the reference value for detecting the VDS peak period is reduced for the above reason, a peak in a period other than the primary side on-period, such as a resonance peak in a current discontinuous period, will be picked up, so that the VDS peak period cannot be detected correctly. Furthermore, when a variation due to a surge is added to VDS, the reference value is raised by that surge, and an incorrect VDS peak period will be detected. Since the VDS peak is reduced when an input voltage on the primary side is reduced with an AC ripple or an input voltage is turned off, the reference value cannot be changed in agreement with VDS, so that the VDS peak period itself cannot be seen.

Depending on the circuit design, the peak of a resonance waveform of the drain voltage VDS in the current discontinuous period may reach a detection reference potential VDS_PH of a peak period Tp of VDS corresponding to the on-period of the primary side switch as shown in FIG. 6. A problem arises in that the secondary side control circuit regards this resonance peak as an on-period of the primary side switch to erroneously determine that there is no abnormality on the primary side, and when a turn-on threshold value (VTH_ON) of the synchronous rectification MOS transistor is reached at a resonance bottom thereafter, the synchronous rectification MOS transistor is turned on at incorrect timings t41 and t42.

Although JP 5115317 B2 describes an invention in which a secondary side control circuit detects an abnormality to stop secondary side control, the invention includes an output load detection circuit, and when an output load is small, secondary side control is stopped, rather than detecting the peak period of the drain voltage to indirectly recognize an abnormality on the primary side and control the secondary side.

SUMMARY OF THE INVENTION

The present invention has been made to solve the above-described problems, and has an object to, in a switching power supply device including a transformer for voltage conversion and a secondary side synchronous rectification element, correctly detect a peak period of the drain voltage to indirectly recognize an operating state on a primary side, such as occurrence of an abnormality on the primary side, to allow on/off control of the secondary side synchronous rectification element to be performed.

The present invention has another object to allow a peak period to be detected even in a drain voltage having a small amplitude, and to prevent resonance in a current discontinuous period from being erroneously detected as the peak period of the drain voltage.

The present invention has still another object to allow a suitable reference value for detecting the peak period of the drain voltage to be generated, and accordingly allow the peak period of the drain voltage to be correctly detected.

To achieve at least one of the abovementioned objects, according to an aspect of the present invention, a switching power supply device includes:

a transformer for voltage conversion;

a synchronous rectification MOS transistor connected in series to a secondary side coil of the transformer; and a secondary side control circuit that performs on/off control of the synchronous rectification MOS transistor based on a drain voltage of the synchronous rectification MOS transistor, wherein the secondary side control circuit includes:

a peak period detection circuit that detects a peak period of the drain voltage of the synchronous rectification MOS transistor; and a determination reference voltage generation circuit that generates a reference voltage to be used as a reference for determining the peak period based on a voltage in the peak period of the drain voltage, the peak period detection circuit detects the peak period of the drain voltage based on the drain voltage of the synchronous rectification MOS transistor and on the reference voltage generated by the determination reference voltage generation circuit, and the secondary side control circuit controls a turn-on timing of the synchronous rectification MOS transistor in accordance with the peak period detected by the peak period detection circuit.

According to the switching power supply device of the above-described configuration, a voltage to be used as a reference for determining the peak period on the basis of the voltage in the peak period of the drain voltage of the secondary side synchronous rectification MOS transistor is generated, and the peak period of the drain voltage is detected on the basis of this determination reference voltage. Thus, even if a peak voltage of the drain voltage varies or the amplitude of the peak voltage decreases, the peak period is detected correctly, and a resonance period in a current discontinuous period is not detected erroneously as the peak period of the drain voltage. Since the peak period of the drain voltage of the secondary side synchronous rectification MOS transistor reflects a conducting period of the primary side switching element, an abnormal state on the primary side, such as a reduction of an input voltage on the primary side, is indirectly recognized by controlling a turn-on timing of the synchronous rectification MOS transistor in accordance with the detected peak period, and on/off control of the secondary side synchronous rectification element can be performed.

Preferably, the determination reference voltage generation circuit includes:

an offset providing circuit that lowers the drain voltage as input toward a lower potential by a predetermined amount;

a sample-and-hold circuit that captures and holds a voltage lowered by the offset providing circuit; and a signal delay circuit that delays a detection signal of the peak period detection circuit by a predetermined time, and the sample-and-hold circuit holds the voltage captured at a timing delayed by the signal delay circuit.

According to the configuration as described above, a voltage obtained by lowering the input drain voltage toward a lower potential by a predetermined amount is used as a reference voltage for determining the peak period. Thus, the peak period of the drain voltage is reliably detected. The sample-and-hold circuit that captures the lowered voltage holds the voltage captured at a timing delayed by the signal delay circuit, and the voltage is used as a reference voltage for determining the peak period. Thus, a voltage from which a surge portion immediately after the start of the peak period has been removed can be held. Accordingly, a reference voltage for determining the peak period that is not affected by a surge is obtained, which allows the peak period to be detected with high accuracy.

Preferably, the determination reference voltage generation circuit includes a low-pass filter provided at a later stage of the offset providing circuit, and the sample-and-hold circuit is configured to capture and hold a voltage having passed through the low-pass filter.

According to this configuration, the drain voltage is changed gradually by the low-pass filter. Thus, when detecting a timing at which the peak period ends and operating the sample-and-hold circuit to cause the captured voltage to be held, a drop of the held voltage is restrained, and a reference voltage for highly accurate peak period determination that is not affected by a changing speed of the drain voltage is obtained.

Preferably, the sample-and-hold circuit includes a switch for sampling and a capacitor that captures the voltage having passed through the low-pass filter while the switch is on, the determination reference voltage generation circuit includes a discharging circuit that discharges charges held in the capacitor of the sample-and-hold circuit, and the discharging circuit discharges part of charges in the capacitor after the peak period elapses.

According to this configuration, charges in the capacitor for holding the sample-and-hold circuit is discharged by a predetermined amount each time when switching is performed. Accordingly, even in a case where the peak voltage of the drain voltage VDS is reduced, the determination reference voltage VDS_PH is also changed promptly following the voltage reduction, and a sudden drop is restrained to allow the determination reference voltage to be maintained at a suitable value.

Preferably, the secondary side control circuit includes a bottom period detection circuit that detects a bottom period of the drain voltage of the synchronous rectification MOS transistor, and the secondary side control circuit generates a signal for enabling turn-on of the synchronous rectification MOS transistor when the bottom period detected by the bottom period detection circuit is started, and for disabling turn-on of the synchronous rectification MOS transistor at a point of time when a predetermined time elapses after the peak period detected by the peak period detection circuit ends.

According to this configuration, the secondary side synchronous rectification element is prevented from being turned on at an erroneous timing particularly in the current discontinuous period to flow a reverse current.

According to the present invention, in a switching power supply device including a synchronous rectification element on the secondary side, an operating state on the primary side, such as occurrence of an abnormality on the primary side, is indirectly recognized by correctly detecting the peak period of the drain voltage, so that on/off control of the secondary side synchronous rectification element is performed. The peak period is detected even in a drain voltage having a small amplitude, and a resonance period in the current discontinuous period is not detected erroneously as the peak period of the drain voltage. Further, a suitable reference value for detecting the peak period of the drain voltage is generated, which produces an effect that the peak period of the drain voltage is correctly detected.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE PREFERRED EMBODIMENT

Hereinafter, one or more embodiments of the present invention will be described with reference to the drawings. However, the scope of the invention is not limited to the disclosed embodiments.

Figure 1:
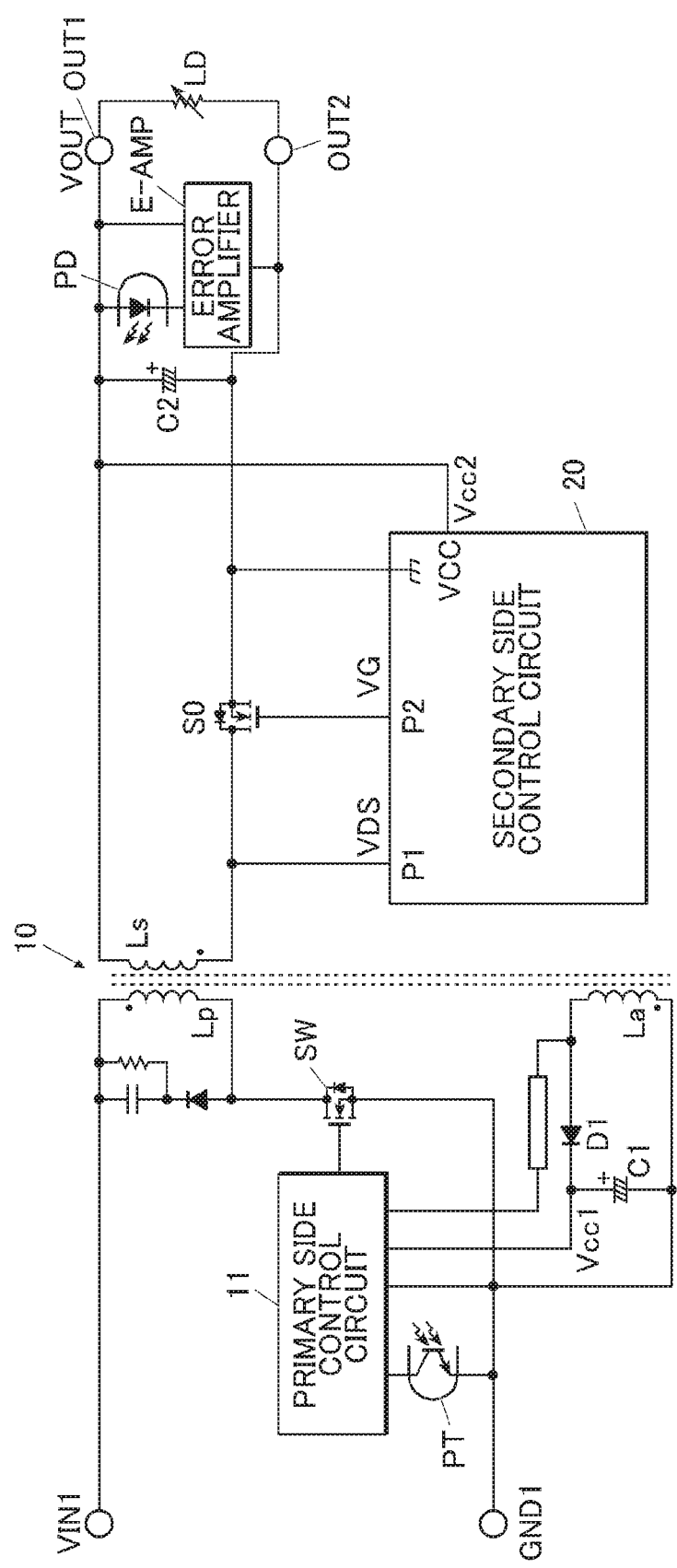
FIG. 1 is a circuit configuration diagram showing a configuration example of a switching power supply device of a secondary side synchronous rectification system which is effective by the application of the present invention.

FIG. 1 shows an embodiment of a switching power supply device of a synchronous rectification system to which the present invention has been applied.

The switching power supply device in the present embodiment is configured as an insulated DC-DC converter including:

a transformer 10 for voltage conversion having a primary side coil Lp, a secondary side coil Ls, and an auxiliary winding La;

a switching element SW including an N-channel MOS transistor and a control circuit (primary side control circuit) 11 therefor on the primary side of the transformer 10; and a MOS transistor S0 serving as a synchronous rectification element and a control circuit (secondary side control circuit) 20 therefor on the secondary side.

In this embodiment, the secondary side coil Ls having a polarity opposite to that of the primary side coil Lp is used in the transformer 10, and the transformer 10 is configured to operate as a flyback converter.

The switching element SW on the primary side is connected in series to the primary side coil Lp of the transformer 10. The primary side control circuit 11 and the secondary side control circuit 20 are each configured as a semiconductor integrated circuit (IC) on a single semiconductor chip, or as a semiconductor device mounted in a single package. A diode D1 and a capacitor C1 are connected in series between the terminals of the auxiliary winding La of the transformer 10. A voltage induced in the auxiliary winding La is rectified by the diode D1 and smoothed by the capacitor C1, so that a power supply voltage Vcc1 for the primary side control circuit 11 is generated and supplied to a power supply terminal of the primary side control circuit 11.

The DC-DC converter of this embodiment also includes a phototransistor PT for receiving light, which is connected to the primary side control circuit 11 and receives a feedback signal from the secondary side circuit. The primary side control circuit 11 is configured to change a switching frequency or a duty ratio of the switching element SW in accordance with the feedback signal to be adaptable to variations in load and input voltage.

On the secondary side of the transformer 10, the DC-DC converter includes:

the synchronous rectification MOS transistor S0 connected between one terminal of the secondary side coil Ls and an output terminal OUT2;

the secondary side control circuit 20 that detects a drain voltage of the synchronous rectification MOS transistor S0 using a voltage generated on the secondary side as a power supply voltage to generate an on/off control signal for the transistor S0; and a smoothing capacitor C2 connected between an output terminal OUT1 and the output terminal OUT2 to stabilize an output voltage VOUT.

The synchronous rectification MOS transistor S0 and the secondary side control circuit 20 may be integrated into a single package. A variable resistance LD connected between the output terminals OUT1 and OUT 2 represents an example of a load or equivalently describes a load.

A power supply terminal VCC of the secondary side control circuit 20 is connected to the output terminal OUT1, and an output voltage VOUT is supplied to the secondary side control circuit 20 as a power supply voltage Vcc2. The voltage induced in the auxiliary winding of the transformer 10 may be rectified and supplied as the power supply voltage for the secondary side control circuit 20.

On the secondary side of the transformer 10, a photodiode PD for feedback and an error amplifier E-AMP are connected between the output terminals OUT1 and OUT2. The error amplifier E-AMP is configured such that a current in proportion to the level of the output voltage VOUT flows in the photodiode PD.

The photodiode PD on the secondary side and the phototransistor PT on the primary side constitute a photo-interrupter serving as an insulated signal transmitter. Light emitted from the photodiode PD on the secondary side is received by the phototransistor PT on the primary side, and a feedback signal in accordance with the intensity of light is generated. The primary side control circuit 11 controls the switching element SW in accordance with this feedback signal.

The secondary side control circuit 20 monitors a voltage VDS at an external terminal (drain voltage detection terminal) P1 connected via a wiring to a drain terminal of the synchronous rectification MOS transistor S0 serving as a secondary side switching element, and generates a control signal (gate drive voltage) VG for turning on or off the synchronous rectification MOS transistor S0 at a predetermined timing, and outputs the control signal VG to a gate terminal of the transistor S0 through the external terminal P2.

Specifically, the drain voltage VDS of the synchronous rectification MOS transistor S0 is in conjunction with turn-on/off of the primary side switching element SW. When the primary side switching element SW is on, VDS attains the peak, and VDS is at the bottom in a period in which the primary side switching element SW is turned off and a current flows into the secondary side. Therefore, the secondary side control circuit 20 monitors VDS and performs control of turning on the synchronous rectification MOS transistor S0 only for a period in which VDS is at the bottom.

As described earlier, the peak period of VDS is equivalent to the on-period of the primary side switching element SW. Therefore, if the peak period of VDS is detected, the on-period of the primary side switching element SW is detected from the secondary side. The length of the turn-on period on the primary side is in proportion to a load current on the secondary side in many power source systems, and the turn-on period on the primary side becomes longer as the load is heavier. Thus, control to be exerted by the secondary side control circuit is optimized on the basis of the peak period of VDS. For example, such control of, in a case where the peak period is short, regarding the load as being light and reducing the output voltage of the gate drive voltage VG to restrain a driving loss of the secondary side control circuit, and reducing consumption power of the power source device, or when the peak period is extremely short, determining that an abnormal state has occurred and stopping driving of the synchronous rectification MOS transistor S0 can be performed.

Figure 2:
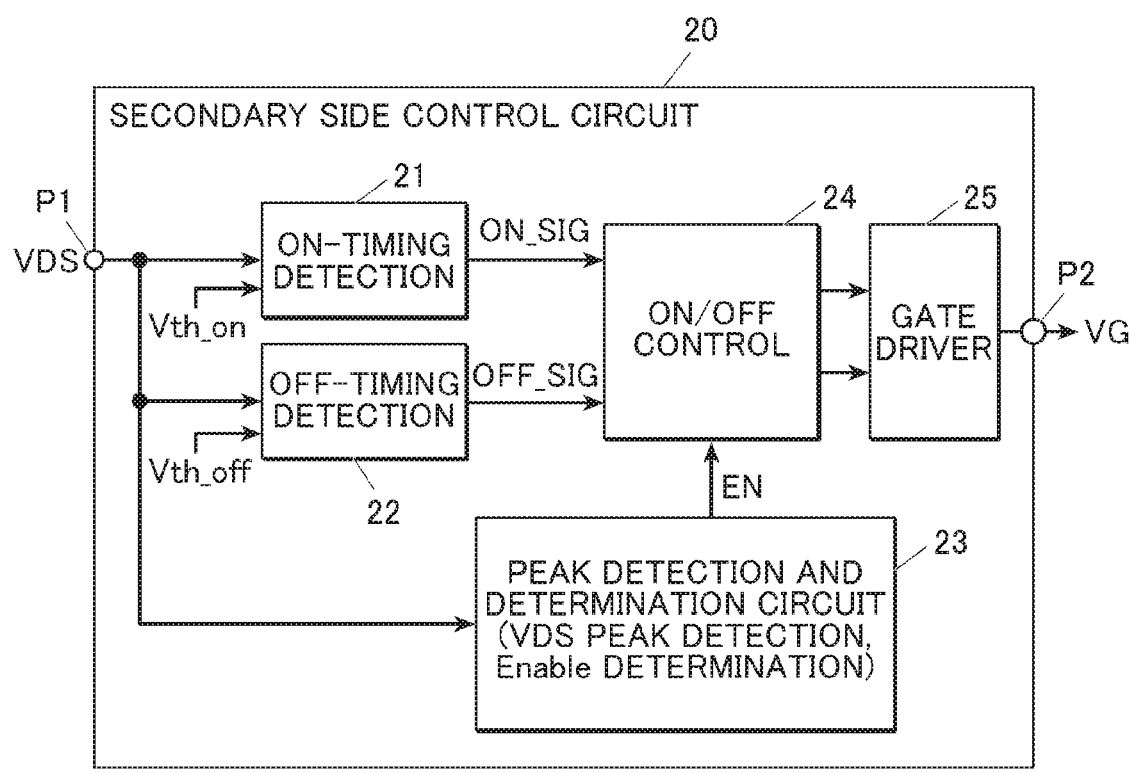
FIG. 2 is a block diagram showing a configuration example of a secondary side control circuit that constitutes the switching power supply device according to the embodiment.

FIG. 2 shows a configuration example of the secondary side control circuit 20 that can execute the control as described above.

As shown in FIG. 2, the secondary side control circuit 20 includes:

an on-timing detection circuit 21 including a comparator that compares the voltage VDS of the drain voltage detection terminal P1 to which the drain terminal of the synchronous rectification MOS transistor S0 is connected and a predetermined threshold voltage Vth_on (for example, −200 mV) and the like; and an off-timing detection circuit 22 including a comparator that compares the voltage VDS of the drain voltage detection terminal P1 and a predetermined threshold voltage Vth_off (for example, 0 to −150 mV) and the like.

The determination threshold value Vth_on of the on-timing detection circuit 21 is set at a voltage taking into consideration a forward voltage of a body diode of the synchronous rectification MOS transistor S0 such that it is reliably detected that a current starts flowing into the body diode.

The secondary side control circuit 20 also includes:

a peak detection and determination circuit 23 that detects a peak period Tp and a bottom period Tb (see FIG. 4) of the drain voltage VDS to generate an enable signal EN;

an on/off control circuit 24 that generates a signal for performing on/off control of the synchronous rectification MOS transistor S0 on the basis of an output ON_SIG of the on-timing detection circuit 21, an output OFF_SIG of the off-timing detection circuit 22, and the enable signal EN output from the peak detection and determination circuit 23; and a gate driver circuit 25 that receives the generated on/off control signal, and outputs the gate drive voltage VG through the external terminal P2.

An AND gate that receives, as inputs, the off-timing detection signal OFF_SIG and the enable signal EN may be provided at a stage prior to the on/off control circuit 24 to enable or disable input of the off-timing detection signal OFF_SIG to the on/off control circuit 24 by means of the enable signal EN.

Figure 3:
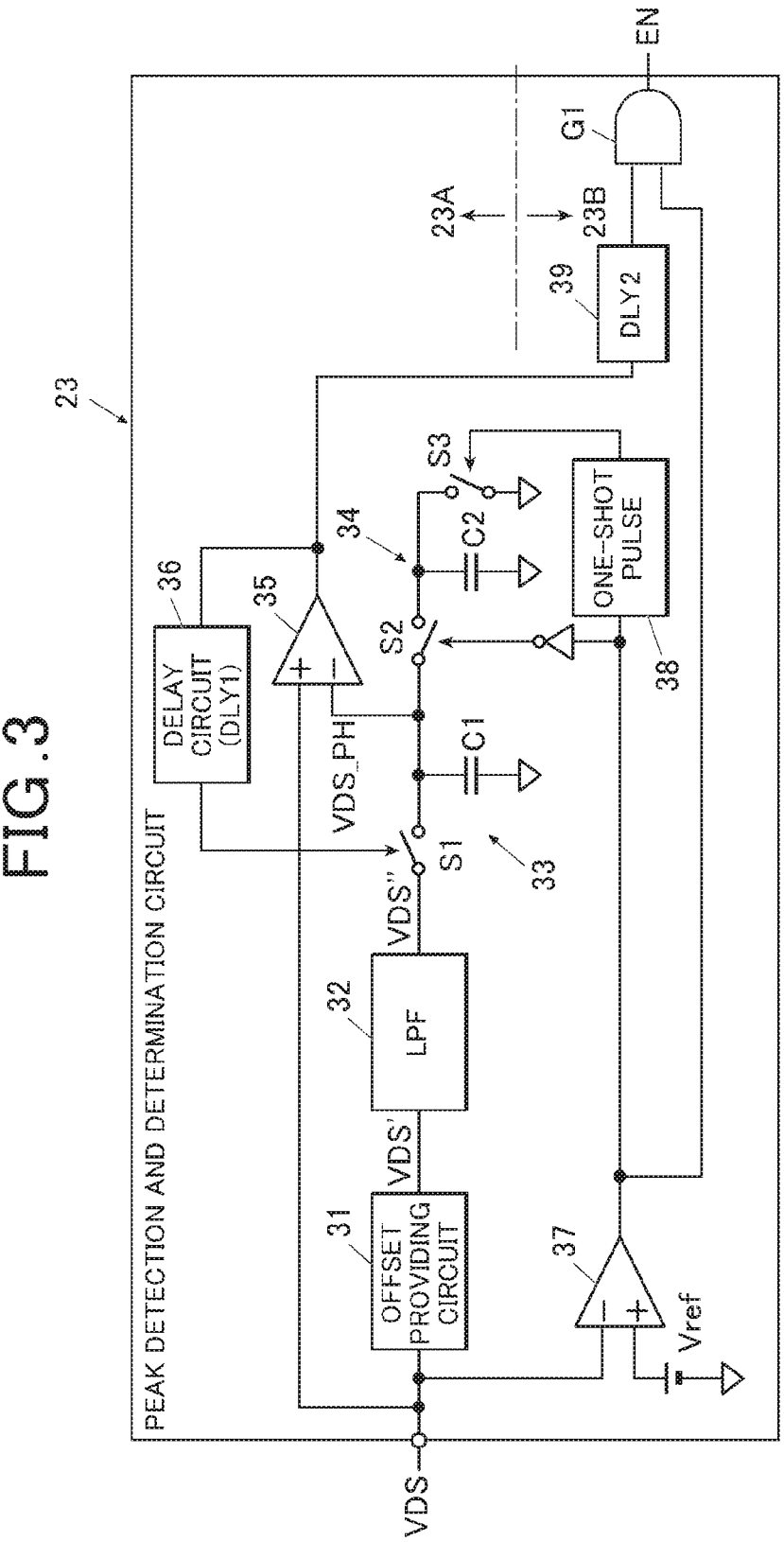
FIG. 3 is a circuit configuration diagram showing a specific example of a peak detection and determination circuit constituting the secondary side control circuit according to the embodiment.

FIG. 3 shows a configuration example of the above-described peak detection and determination circuit 23.

As shown in FIG. 3, the peak detection and determination circuit 23 includes:

a peak detector 23A that detects the peak period Tp of the drain voltage VDS; and an enable determiner 23B that detects the bottom period Tb and generates the enable signal EN for enabling turn-on of the synchronous rectification MOS transistor S0, that is, turn-on of a source side switch of the gate driver circuit 25 that generates the gate drive voltage VG.

The peak detector 23A includes:

an offset providing circuit 31 that provides the voltage VDS at the drain voltage detection terminal P1 with a minus offset of several tens of millivolts to several hundreds of millivolts, for example;

a low-pass filter (LPF) 32 for rounding the waveform of a drain voltage VDS' after being provided with the offset;

a sample-and-hold circuit 33 including a sampling switch S1 and a capacitor C1;

a discharging circuit 34;

a comparator 35 that compares a voltage captured into the sample-and-hold circuit 33 and the drain voltage VDS at the terminal P1 to detect the peak period Tp; and a delay circuit 36 that delays only rising of an output (pulse) of the comparator 35.

Figure 4:
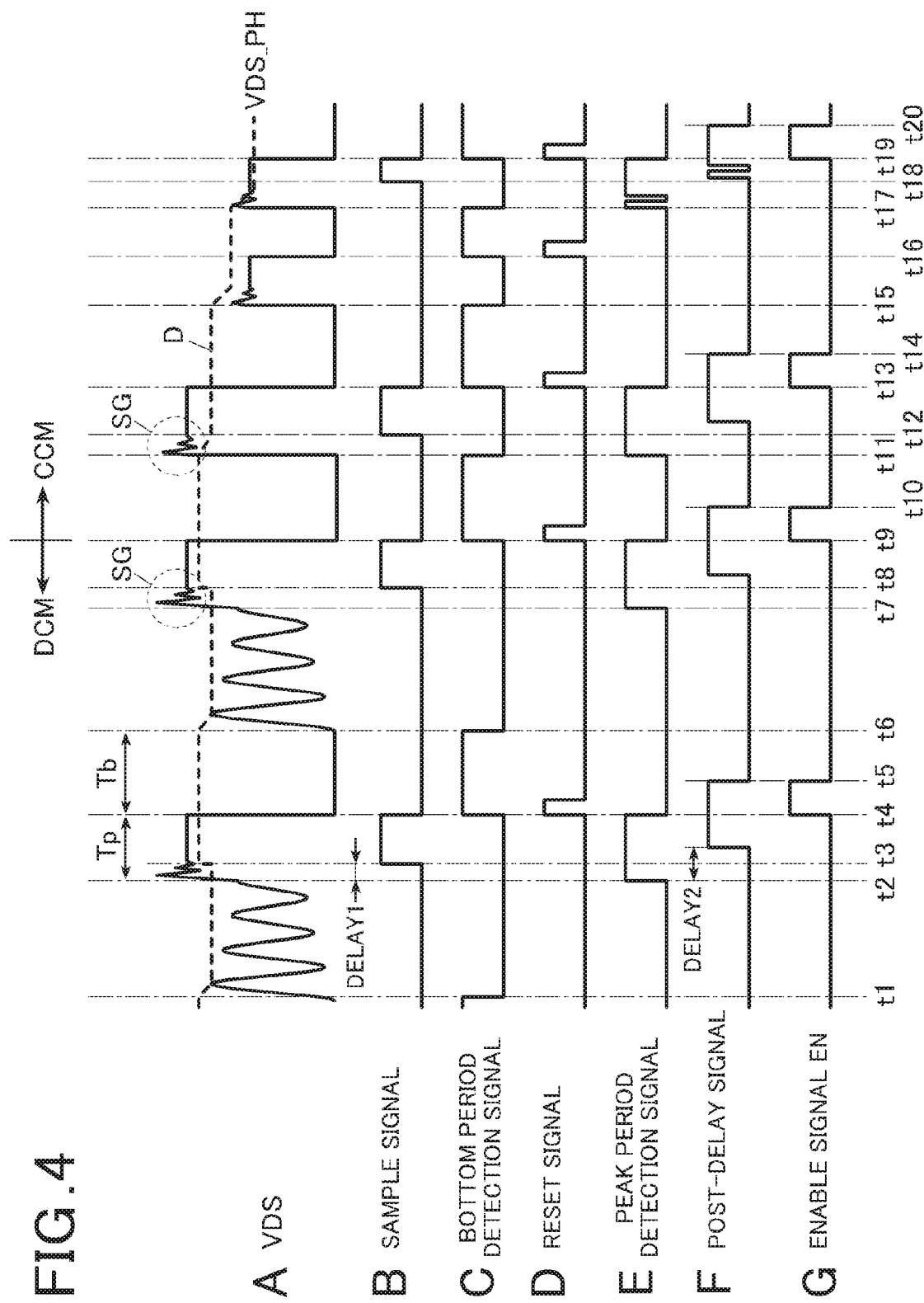
FIG. 4 is a timing chart showing changes in signals in respective portions when in a normal operation and when an input voltage is reduced in the secondary side control circuit according to the embodiment.

A delay time provided by the delay circuit 36 is settled to correspond to the width of a surge portion SG in the waveform of the drain voltage VDS' shown in FIG. 4.

By applying a voltage obtained by holding, in the sample-and-hold circuit 33, the drain voltage VDS' provided with a minus offset by the offset providing circuit 31 to an inverting input terminal of the comparator 35 that receives, as an input, the drain voltage VDS as the reference voltage VDS_PH for determining the peak period, even if the peak period is changed in level, a voltage lower than the level of the peak period by several tens of millivolts to several hundreds of millivolts can be used as a peak period determination reference voltage. Thus, detection of a correct VDS peak period is performed stably even if the state of a power source is changed, and the comparator 35 is prevented from responding to a VDS input having a small amplitude, such as resonance in a current discontinuous period, because the reference voltage VDS_PH has a small potential difference from the drain voltage VDS.

On/off control of the sampling switch S1 of the sample-and-hold circuit 33 is performed by a signal obtained by delaying the output of the comparator 35 by the delay circuit 36, and a drain voltage VDS" at a point of time when the switch S1 is turned off is held in the capacitor C1. In this manner, by holding the drain voltage VDS" in the sample-and-hold circuit 33 by a delay signal, a surge portion immediately after the drain voltage VDS rises is prevented from being sampled, so that the correct peak period determination reference voltage VDS_PH is generated.

Since the low-pass filter 32 is provided between the offset providing circuit 31 and the sample-and-hold circuit 33, a high frequency component included in the drain voltage VDS is removed, and the waveform of the drain voltage VDS is rounded. Accordingly, a surge voltage to be added to VDS is restrained when the drain voltage VDS rises, and when VDS falls, the inclination of the falling waveform is made gradual to restrain a drop of VDS at a sample cancelling timing. That is, the peak voltage held in the sample-and-hold circuit 33 is prevented from dropping.

The discharging circuit 34 includes:

a charge transfer switch S2 that transfers charges in the capacitor C1 of the sample-and-hold circuit 33;

a capacitor C2 that holds transferred charges; and a discharging switch S3 that discharges accumulated charges in the capacitor C2.

The switches S2 and S3 are subjected to a turn-on/off operation by a signal from the enable determiner 23B.

The enable determiner 23B includes:

a comparator 37 for comparing the voltage VDS at the drain voltage detection terminal P1 and a predetermined voltage Vref to detect the bottom period Tb;

a one-shot pulse generation circuit 38 that generates a pulse in synchronization with rising of the output of the comparator 37;

a delay circuit 39 that delays the output of the comparator 35 of the peak detector 23A; and an AND gate G1 that calculates a logical product of a signal delayed by the delay circuit 39 and an output signal of the comparator 37 for bottom detection.

Then, an output of the AND gate G1 is supplied to the on/off control circuit 24 as the enable signal EN for enabling turn-on of the sync side switch of the gate driver circuit 25 that generates the gate drive voltage VG, that is, turn-off of the synchronous rectification MOS transistor S0. The delay time produced by the delay circuit 39 is settled considering the time required for the drain voltage VDS to drop from the peak to approximately 10% in a normal switching operation in which a current flows into the secondary side synchronous rectification MOS transistor S0.

The output of the comparator 37 is supplied as a control signal for the charge transfer switch S2 of the discharging circuit 34, and the output of the one-shot pulse generation circuit 38 is supplied as a control signal for the discharging switch S3 of the discharging circuit 34. Thus, the discharging circuit 34 turns on the switch S2 in the peak period of VDS to connect the capacitor C2 of the discharging circuit 34 to the sample-and-hold circuit 33 and make the potential at the capacitor C2 identical to the potential at C1, and turns on the switch S3 in the bottom period of VDS to discharge charges in the capacitor C2 for resetting.

Then, when the switch S2 is turned on next, part of charges in the capacitor C1 moves to C2, and a holding potential at C1 is reduced in accordance with the capacitance ratio between the capacitors C1 and C2. By executing the operation as described above for each switching cycle (each pulse) to gradually discharge the holding voltage, VDS_PH is prevented from being fixed, and is changed promptly following such a situation in which the drain voltage VDS in the peak period is reduced.

Figure 5:
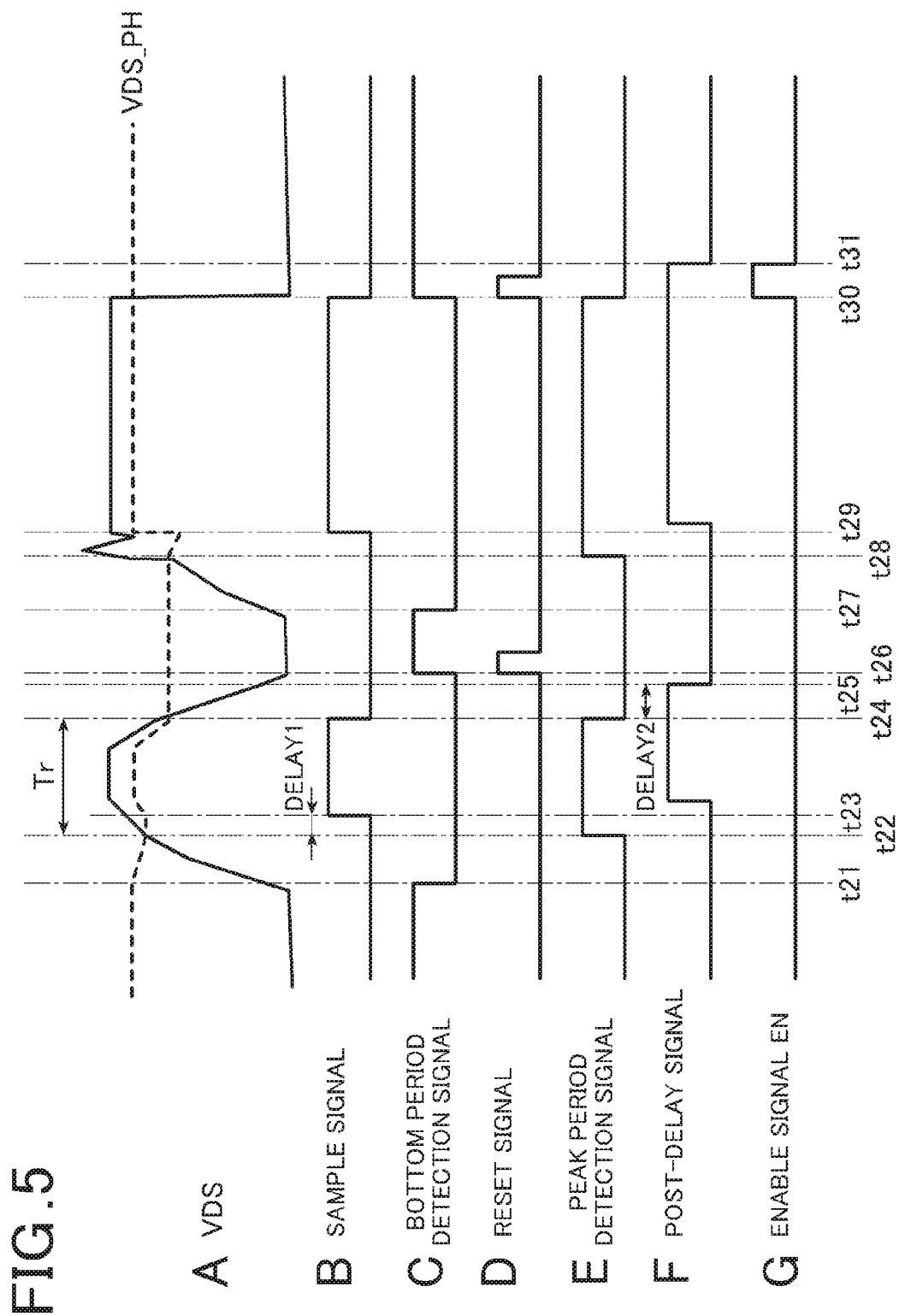
FIG. 5 is a timing chart showing changes in signals in respective portions when a resonance width and an amplitude of a drain voltage are large in the secondary side control circuit according to the embodiment.
Figure 6:
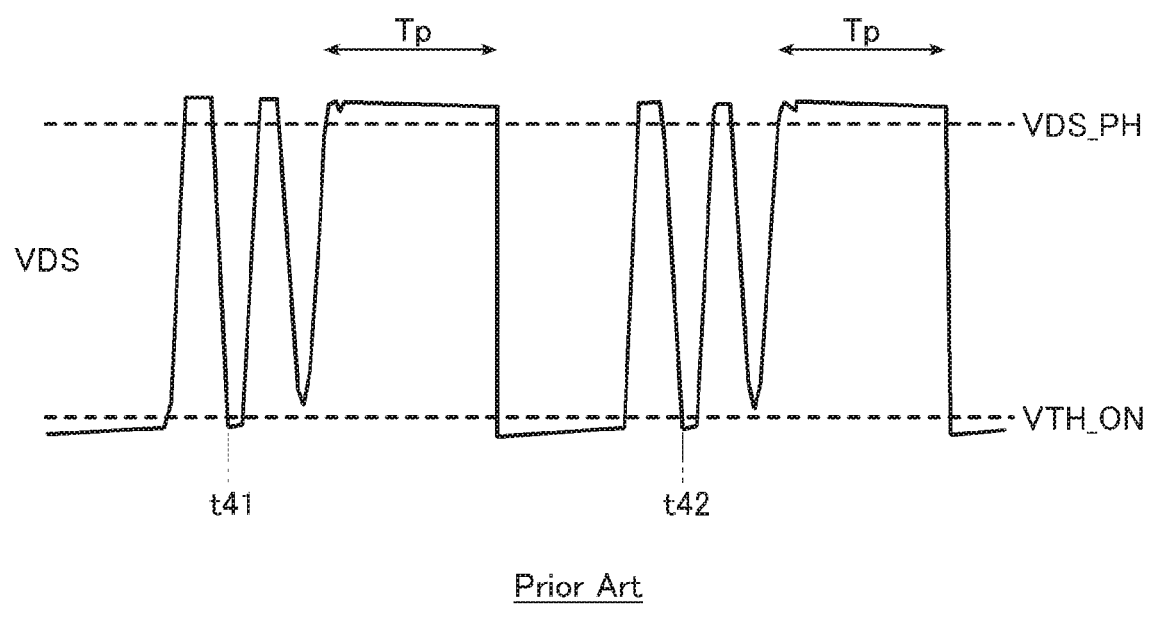
FIG. 6 is a waveform diagram showing how a drain voltage including a resonance having a large amplitude changes in a current discontinuous period in the switching power supply device of the secondary side synchronous rectification system.

Next, the operation of the peak detection and determination circuit 23 will be described with reference to timing charts shown in FIG. 4 and FIG. 5. FIG. 4 shows a timing chart obtained in a normal operation and when an input voltage is reduced. FIG. 5 shows a timing chart obtained when a resonance width and an amplitude of a drain voltage are large.

In FIG. 4 and FIG. 5, the drain voltage VDS of the synchronous rectification MOS transistor S0 is shown at (a). The output of the delay circuit 36 for turning on/off the switch S1 is shown at (b). The output of the comparator 37 for bottom period detection is shown at (c). The output pulse of the one-shot pulse generation circuit 38 for resetting the discharging circuit 34 is shown at (d). The output of the comparator 35 for peak period detection is shown at (e). The output of the delay circuit 39 for delaying the output of the comparator 35 is shown at (f). A change in the enable signal EN output from the AND gate G1 is shown at (g). The determination reference voltage VDS_PH held in the sample-and-hold circuit 33 and supplied to the comparator 35 for peak period detection is indicated by a broken line D at (a) in FIG. 4.

First, an operation of detecting the peak period Tp of the drain voltage VDS and an operation of adjusting the reference voltage VDS_PH for peak period detection will be described with reference to FIG. 4. The left half of FIG. 4 (t1 to t9) shows a timing chart when operating in a current discontinuous mode (DCM) (at a light load), and the right half (t10 to t20) shows a timing chart in a case where the input voltage on the primary side is reduced when operating in a current continuous mode (CCM) (at a heavy load).

As shown at (a) in FIG. 4, when the drain voltage VDS rises and exceeds a threshold value Vref for bottom period detection at a timing t1, the output of the comparator 37 changes to the low level as shown at (c) (at this point of time, the switch S1 of the sample-and-hold circuit 33 is off, and the capacitor C2 has been reset).

Then, the transfer switch S2 of the discharging circuit 34 is turned on, and part of charges in the capacitor C1 is transferred to the capacitor C2, so that the determination reference voltage VDS_PH held in the capacitor C1 is reduced to C1/(C1+C2) in accordance with the ratio of C2 to C1 (see the broken line at (a) in FIG. 4).

Thereafter, when the drain voltage VDS rises and exceeds the determination reference voltage VDS_PH, the output of the comparator 35 for peak period detection changes to the high level (t2) as shown at (e). Then, after a delay time Delay1 provided by the delay circuit 36, the output of the delay circuit 36 changes to the high level (t3). Then, the switch S1 of the sample-and-hold circuit 33 is turned on to start charging of the capacitors C1 and C2, and VDS_PH rises to VDS'.

When a delay time Delay2 provided by the delay circuit 39 elapses after the output of the comparator 35 for peak period detection changes to the high level (t2), the output of the delay circuit 39 changes to the high level. Thereafter, when the peak period Tp ends at a timing t4, and the drain voltage VDS falls, the output of the comparator 35 for peak period detection and the output of the delay circuit 36 change to the low level. The switch S1 of the sample-and-hold circuit 33 is turned off, and the charging voltage of the capacitor C1 is held as the determination reference voltage VDS_PH. The output of the comparator 37 for bottom period detection changes to the high level at this timing t4, and the transfer switch S2 of the discharging circuit 34 is turned off, and a pulse is generated by the one-shot pulse generation circuit 38. With that pulse, the discharging switch S3 of the discharging circuit 34 is turned on, and charges in the capacitor C2 are reset.

At this time (t4), since the output of the comparator 37 for bottom period detection and the output of the delay circuit 39 both change to the high level, the enable signal EN which is the output of the AND gate G1 changes to the high level. At a timing t5 when the output of the delay circuit 39 changes to the low level, the enable signal EN changes to the low level.

If the on-timing detection circuit 21 shown in FIG. 2 outputs the detection signal ON_SIG in a period in which the enable signal EN is at the high level, turn-on of the synchronous rectification MOS transistor S0 is enabled, and the synchronous rectification MOS transistor S0 is turned on. In a case where the on-timing detection circuit 21 outputs the detection signal ON_SIG after the enable signal EN changes to the low level at the timing t5, the synchronous rectification MOS transistor S0 is not turned on. The operation in a period between timings t6 and t10 is the same as the operation in the period between the timings t1 and t5, and description thereof is omitted.

Thereafter, in a case where the load becomes heavier to cause a transition to the current continuous mode (CCM), resonance in the current discontinuous period is no longer found in the drain voltage VDS as in a period between t11 and t15, but the circuit operation is substantially the same. When the input voltage on the primary side is reduced in a flyback type power source as shown in FIG. 1, the peak of the drain voltage VDS is also reduced as in a period between timings t14 and t16, and does not reach the determination reference voltage VDS_PH. Thus, the output of the comparator 35 for peak period detection does not change to the high level, so that neither the output of the delay circuit 39 (pulse) nor the enable signal EN is generated. As a result, the synchronous rectification MOS transistor S0 is not turned on.

Since the peak period determination reference voltage VDS_PH generated by the sample-and-hold circuit 33 is gradually reduced by the discharging operation of the discharging circuit 34, a period in which VDS>VDS_PH holds occurs, and the output of the comparator 35 for peak period detection is changed because of a surge or the like. Since a surge period is shorter than the delay time Delay1 provided by the delay circuit 36, the voltage in the surge period is not captured into the capacitor C1 of the sample-and-hold circuit 33, and sampling as usual is executed.

On the other hand, the output of the comparator 35 and the output of the delay circuit 39 change because a surge is visible for the comparator 35 for peak period detection. The enable signal EN changes to the high level only for a period in which the high level of the output of the comparator 37 for bottom period detection and the high level of the output of the delay circuit 39 overlap, and turn-on of the synchronous rectification MOS transistor S0 is enabled. Therefore, only a peak period after a surge in the drain voltage VDS is detected and turn-on is enabled if only a little load exists, and thus, there is no problem in operation.

Next, an operation of the peak detection and determination circuit 23 in a case where the peak of the drain voltage VDS becomes a value substantially equal to a resonance amplitude in a current discontinuous period, such as a state in which an input voltage on the primary side is very small, will be described with reference to the timing chart shown in FIG. 5.

As indicated in a period Tr in FIG. 5, when the resonance amplitude of the drain voltage VDS exceeds the peak period determination reference voltage VDS_PH, a phenomenon in which the output (e) of the comparator 35 for peak period detection changes to the high level (a timing t22) occurs. In this case, the on-timing detection circuit outputs the detection signal ON_SIG when VDS falls between t24 and t26, whereas turn-on of the synchronous rectification MOS transistor S0 needs to be prevented.

In the peak detection and determination circuit 23 shown in FIG. 3, the output (c) of the comparator 37 for bottom period detection changes to the low level at a timing t21 when the resonance waveform of VDS rises. Then, the charge transfer switch S2 of the discharging circuit 34 is turned on. Charges in the capacitor C1 of the sample-and-hold circuit 33 are transferred to the capacitor C2 of the discharging circuit 34, and the reference voltage VDS_PH is reduced by the capacitance ratio. Thereafter, when VDS exceeds the reference voltage VDS_PH at the timing t22, the output (e) of the comparator 35 for peak period detection changes to the high level, and the sampling signal (b) changes to the high level after the delay time Delay1 provided by the delay circuit 36 elapses (the timing t23) to turn on the switch S1, and the reference voltage VDS_PH changes to a voltage in accordance with the VDS input (t23 to t24).

Thereafter, when the drain voltage VDS is reduced to be smaller than or equal to the reference voltage VDS_PH, the output (e) of the comparator 35 for peak period detection changes to the low level (the timing t24). Then, the sampling signal (b) changes to the low level to turn off the switch S1, and the reference voltage VDS_PH which is the charging voltage of the capacitor C1 is held.

Subsequently, the output (f) of the delay circuit 39 changes to the low level (the timing t25) after the delay time Delay2 provided by the delay circuit 39 from t24, whereas VDS has not been completely reduced at this point of time, and the output (c) of the comparator 37 for bottom period detection is at the low level. Thus, the enable signal EN for enabling turn-on of the synchronous rectification MOS transistor S0 is not output.

Thus, even if the on-timing detection circuit 21 outputs the detection signal ON_SIG when the drain voltage VDS falls between the timings t24 and t26, the synchronous rectification MOS transistor S0 is prevented from being turned on.

An operation after a timing t27 is the same as the operation between the timings t2 and t6 described with reference to FIG. 4, and detailed description is omitted. However, since VDS falls rapidly in a period between t30 and t31, the output (c) of the comparator 37 for bottom period detection changes to the high level while the output (f) of the delay circuit 39 is at the high level. Thus, when the enable signal EN for enabling turn-on of the synchronous rectification MOS transistor S0 is output while the on-timing detection circuit 21 outputs the detection signal ON_SIG, the synchronous rectification MOS transistor S0 is turned on.

As described above, in the secondary side control circuit according to the above-described embodiment, by holding the voltage in the peak period in which the drain voltage VDS of the secondary side synchronous rectification MOS transistor S0 is provided with an offset to generate the determination reference voltage VDS_PH and comparing the determination reference voltage VDS_PH with the drain voltage VDS, the peak period of VDS is detected. Since the peak period of VDS is equivalent to the on-period of the primary side switching element, the state of the primary side switch is detected indirectly on the secondary side. Then, occurrence of an abnormal state such as a reduction of an input voltage can be detected on the basis of this detection result to execute on/off control of the secondary side synchronous rectification MOS transistor S0.

Since the peak period determination reference voltage VDS_PH is generated on the basis of the peak hold value of the drain voltage VDS of the secondary side synchronous rectification MOS transistor S0, the secondary side control circuit according to the above-described embodiment can change the determination reference voltage VDS_PH in accordance with the voltage in the peak period of VDS, and is adaptable to a wide VDS input range. Since the peak of a voltage obtained by subtracting a predetermined offset from the input drain voltage VDS is held and used as the determination reference voltage VDS_PH, the peak period is detected reliably even for VDS having a small amplitude. Since the peak voltage of VDS is generally higher than the maximum value of the resonance waveform in the current discontinuous period, the waveform in this resonance period is less likely to be detected erroneously as a VDS peak period.

Since a circuit configuration including a switch and a capacitor is adopted as the sample-and-hold circuit 33 that holds the peak of the drain voltage VDS avoiding a circuit configuration including a diode and a capacitor, a drop of a holding voltage due to the forward voltage Vf of a diode is reduced. Since the forward voltage Vf of a diode has temperature dependence, the determination reference voltage VDS_PH may vary with a change in temperature. But use of a switch such as a MOS transistor instead of a diode allows an influence that would be caused by a change in temperature to be avoided, and a stable control operation is performed.

Since the delay circuit 36 is provided at a later stage of the comparator 35 for peak period detection, and the sample-and-hold circuit 33 performs holding at a timing avoiding a period in which a VDS surge occurs, an influence on a peak hold value of a surge, that is, on the determination reference voltage VDS_PH is restrained.

The secondary side control circuit according to the above-described embodiment is configured such that the discharging circuit 34 is connected to the sample-and-hold circuit 33 that generates the determination reference voltage VDS_PH to discharge charges in the capacitor C1 for holding by a predetermined amount each time when switching is performed. Thus, even in a case where the peak voltage of the drain voltage VDS is reduced, the determination reference voltage VDS_PH is changed promptly following the voltage reduction, and is maintained at a suitable value.

Since the VDS peak period detection signal is delayed, and a logical sum of the detection signal and the VDS bottom detection signal is calculated to generate the enable signal EN for enabling turn-on of the secondary side synchronous rectification MOS transistor S0, the synchronous rectification MOS transistor S0 is prevented from being turned on erroneously in the current discontinuous period. That is, although both the primary side switching element SW and the secondary side synchronous rectification MOS transistor S0 are essentially off in the current discontinuous period, VDS may be disturbed by an abnormal operation of the circuit or the like, and when the on-timing detection circuit 21 responds to this VDS to turn on the secondary side synchronous rectification MOS transistor S0, a reverse current may flow. In the above-described embodiment, the delay circuit 39 is provided at a later stage of the comparator 35 for peak period detection to generate the enable signal EN for enabling turn-on of the synchronous rectification MOS transistor S0 only for the delay time Delay2. Thus, a reverse current is prevented in the current discontinuous period in which the time until VDS changes from the peak to the bottom is long.

Although the invention made by the inventors has been described specifically on the basis of an embodiment, the present invention is not limited to the aforementioned embodiment. For example, the offset providing circuit in the above-described embodiment may be a level conversion circuit through use of an operational amplifier, or may be a level shift circuit in which element properties such as a forward voltage of a diode are utilized without using an operational amplifier. Although the low-pass filter 32 is provided at a later stage of the offset providing circuit in the above-described embodiment, the order of the offset providing circuit 31 and the low-pass filter 32 may be reversed, or the low-pass filter 32 may be omitted. An offset providing circuit that raises VDS to the plus side by a predetermined amount may be provided on the non-inverting input terminal side of the comparator 35 for peak period detection.

The secondary side synchronous rectification control circuit according to the present invention is not limited to the switching power supply device (DC-DC converter) of the flyback system as shown in FIG. 1, but may be applied to a DC-DC converter of another system such as a half-bridge system, for example. The secondary side synchronous rectification control circuit according to the present invention can also be applied to an LLC resonance converter in which a current resonance circuit including an inductor and a capacitor is provided on the primary side.

What is claimed is:
1. A switching power supply device comprising:
a transformer for voltage conversion;
a synchronous rectification MOS transistor connected in series to a secondary side coil of the transformer; and
a secondary side control circuit that performs on/off control of the synchronous rectification MOS transistor based on a drain voltage of the synchronous rectification MOS transistor,
wherein the secondary side control circuit includes:
a peak period detection circuit that detects a peak period of the drain voltage of the synchronous rectification MOS transistor; and
a determination reference voltage generation circuit that generates a reference voltage to be used as a reference for determining the peak period based on a voltage in the peak period of the drain voltage,
wherein the peak period detection circuit detects the peak period of the drain voltage based on the drain voltage of the synchronous rectification MOS transistor and the reference voltage generated by the determination reference voltage generation circuit,
wherein the secondary side control circuit controls a turn-on timing of the synchronous rectification MOS transistor in accordance with the peak period detected by the peak period detection circuit,
wherein the determination reference voltage generation circuit includes:
an offset providing circuit that lowers the drain voltage as input toward a lower potential by a predetermined amount;

a sample-and-hold circuit that captures and holds a voltage lowered by the offset providing circuit; and a signal delay circuit that delays a detection signal of the peak period detection circuit by a predetermined time, and wherein the sample-and-hold circuit holds the voltage captured at a timing delayed by the signal delay circuit.

2. The switching power supply device according to claim 1, wherein:

the determination reference voltage generation circuit includes a low-pass filter provided at a later stage of the offset providing circuit, and the sample-and-hold circuit is configured to capture and hold a voltage having passed through the low-pass filter.

3. The switching power supply device according to claim 2, wherein:

the sample-and-hold circuit includes a switch for sampling and a capacitor that captures the voltage having passed through the low-pass filter while the switch is on, the determination reference voltage generation circuit includes a discharging circuit that discharges charges held in the capacitor of the sample-and-hold circuit, and the discharging circuit discharges part of charges in the capacitor after the peak period elapses.

4. A switching power supply device comprising:

a transformer for voltage conversion;

a synchronous rectification MOS transistor connected in series to a secondary side coil of the transformer; and a secondary side control circuit that performs on/off control of the synchronous rectification MOS transistor based on a drain voltage of the synchronous rectification MOS transistor, wherein the secondary side control circuit includes:

a peak period detection circuit that detects a peak period of the drain voltage of the synchronous rectification MOS transistor; and a determination reference voltage generation circuit that generates a reference voltage to be used as a reference for determining the peak period based on a voltage in the peak period of the drain voltage, wherein the peak period detection circuit detects the peak period of the drain voltage based on the drain voltage of the synchronous rectification MOS transistor and the reference voltage generated by the determination reference voltage generation circuit, wherein the secondary side control circuit includes a bottom period detection circuit that detects a bottom period of the drain voltage of the synchronous rectification MOS transistor, and wherein the secondary side control circuit generates a signal for enabling turn-on of the synchronous rectification MOS transistor when the bottom period detected by the bottom period detection circuit is started, and for disabling turn-on of the synchronous rectification MOS transistor at a point of time when a predetermined time elapses after the peak period detected by the peak period detection circuit ends.

* * * * *